United States Patent
Dong et al.

(10) Patent No.: US 12,276,576 B2
(45) Date of Patent: Apr. 15, 2025

(54) VACUUM-HELIUM-LEAK-DETECTION METHOD BASED ON CARBON-NANOTUBE-BASED FIELD-EMISSION SENSOR

(71) Applicant: Wenzhou University, Zhejiang (CN)

(72) Inventors: Changkun Dong, Wenzhou (CN); Ruizi Liu, Wenzhou (CN); Jie Wang, Wenzhou (CN)

(73) Assignee: WENZHOU UNIVERSITY, Zhejiang (CN)

( * ) Notice: Subject to any disclaimer, the term of this patent is extended or adjusted under 35 U.S.C. 154(b) by 274 days.

(21) Appl. No.: 18/093,823

(22) Filed: Jan. 6, 2023

(65) Prior Publication Data

US 2023/0213407 A1    Jul. 6, 2023

(30) Foreign Application Priority Data

Jan. 6, 2022 (CN) .......................... 202210008337.1

(51) Int. Cl.
 *G01M 3/20* (2006.01)
 *G01M 3/26* (2006.01)
 *G01M 3/40* (2006.01)

(52) U.S. Cl.
 CPC ..................... *G01M 3/26* (2013.01)

(58) Field of Classification Search
 CPC ............ G01M 3/00; G01M 3/20; G01M 3/26; G01M 3/40
 See application file for complete search history.

(56) References Cited

U.S. PATENT DOCUMENTS

2008/0202211 A1\* 8/2008 Wetzig ................. G01N 33/005
                                                         73/40.7
2024/0344917 A1\* 10/2024 Mao ......................... G01M 3/20

FOREIGN PATENT DOCUMENTS

GB            663852 A   \* 12/1951

\* cited by examiner

*Primary Examiner* — Nguyen Q. Ha
(74) *Attorney, Agent, or Firm* — Leong C. Lei

(57) ABSTRACT

A vacuum-helium-leak-detection method based on a carbon-nanotube-based field-emission sensor that includes a carbon-nanotube-based cathode having a Raman amorphous peak $I_D$/graphite peak $I_G$ ratio greater than 1.0. The method involves: setting a field-emission current at an initial, small emission current, recording an average of values of the field-emission current in a time period t, forming a sensing characteristic curve of the sensor, and performing fitting on the sensing characteristic curve so as to obtain an index curve; converting pressure values of helium gas into vacuum leak rates; and packaging the cathode into a vacuum chamber in a system to be detected, performing testing when a helium stream in the system to be detected reaches balance, obtaining an average of current variations in the time period t during the testing, and comparing the average with the index curve so as to determine a vacuum leak rate of the system to be detected.

2 Claims, 5 Drawing Sheets

VACUUM-HELIUM-LEAK-DETECTION METHOD BASED ON CARBON-NANOTUBE-BASED FIELD-EMISSION SENSOR

BACKGROUND OF THE INVENTION

1. Technical Field

The present invention relates to sensor-based detection, and more particularly to a vacuum-helium-leak-detection method based on a carbon-nanotube-based field-emission sensor.

2. Description of Related Art

Vacuum systems are required to operate at high vacuum. Any leak in a vacuum system can damage related testing devices and degrade their performance. Therefore, leak detection is more than important for vacuum systems. Currently, there are various approaches to leak detection for vacuum systems. For example, a vacuum gauge may be used with an indicating substance such as hydrogen, carbon monoxide, or ethanol to measure variations in vacuum at a suspected leaking site. Among the known leak detection approaches, the use of a helium mass spectrometer is particularly popular and has had mature industrial applications because of its outstanding sensitivity and reliability. However, helium mass spectrometers, typically being bulky, require high vacuum for operation and need direct connection with devices or systems to be detected, making their application scope limited. Besides, gas adsorption and desorption happening inside a helium mass spectrometer can impact its measurement for a dynamic vacuum system, leading to inaccurate measurement results.

Carbon nanotubes (CNTs) have been extensively used in gas sensors due to their large specific surface area and excellent physical/chemical properties. When a carbon nanotube absorbs gas molecules like $H_2$, $NO_2$, and CO, it exhibits changes in physical properties such as electric resistance and electric capacity, thereby providing indication for gas monitoring. The inventors of the present invention found in tests that a carbon-nanotube-based cathode can sense helium gas and thus devised the technical schemes disclosed herein for detecting pressure changes in a system to be detected.

SUMMARY OF THE INVENTION

In order to address the defects and shortcomings of the prior art, the primary objective of the present invention is to provide a vacuum-helium-leak-detection method based on a carbon-nanotube-based field-emission sensor.

For achieving the foregoing objective, the vacuum-helium-leak-detection method of the present invention uses the carbon-nanotube-based field-emission sensor that comprises a carbon-nanotube-based cathode and an electrically conductive anode, and the method comprises the following steps:

(1) performing a Joule-heat degassing process on the carbon-nanotube-based cathode for a time period to with a large field-emission current having a density $J_0$ so that Joule heat makes carbon nanotubes of the cathode release gas that was absorbed on their surfaces previously thus enters the carbon nanotubes into an intrinsic emission state;

(2) upon completion of the degassing process, setting the field-emission current to an initial, small emission current thereof rapidly, recording an average of values of the field-emission current in a time period t, testing the carbon-nanotube-based cathode for field-emission sensing effect with helium gas at different pressure levels so as to form a sensing characteristic curve of the carbon-nanotube-based field-emission sensor, performing fitting on the sensing characteristic curve so as to obtain an index curve, and converting the different pressure levels of the helium gas into corresponding vacuum leak rates; and;

(3) packaging the carbon-nanotube-based cathode into a vacuum chamber in a system to be detected, performing testing when a helium stream reaches balance, obtaining an average of current variations in the time period t from the testing, comparing the average of the current variations with the index curve obtained in Step (2) so as to determine a vacuum leak rate of the system to be detected.

Further, the carbon-nanotube-based cathode is prepared using a CVD method, which involves: preparing a film used to form the carbon-nanotube-based cathode at a high temperature by using a Hastelloy alloy as a substrate, using argon as a protective gas, and using acetylene as a carbon-source gas required by growth of the carbon nanotubes.

The present invention thus has the following innovations and beneficial effects.

The inventors of the present invention found in tests that carbon-nanotube-based cathode can sense helium gas and thus propose the technical schemes that determine a leak rate of a dynamic vacuum system according to changes in the pressure in the system to be detected caused by permeating helium.

The present invention will be further explained through description of its effects as demonstrated by experiment data.

BRIEF DESCRIPTION OF THE DRAWINGS

In order to better illustrate technical features of embodiments of the present invention or of the prior art, brief introduction to accompanying drawings used to describe embodiments of the present invention or of the prior art are provided below. Apparently, the accompanying drawings listed below merely refer to some but not all embodiments of the present invention. For those of ordinary skill in the art, more drawings can be derived from these drawings without paying creative efforts, and all these derived drawings will be part of the scope of the present invention, wherein.

DETAILED DESCRIPTION OF THE INVENTION

Figure 1:
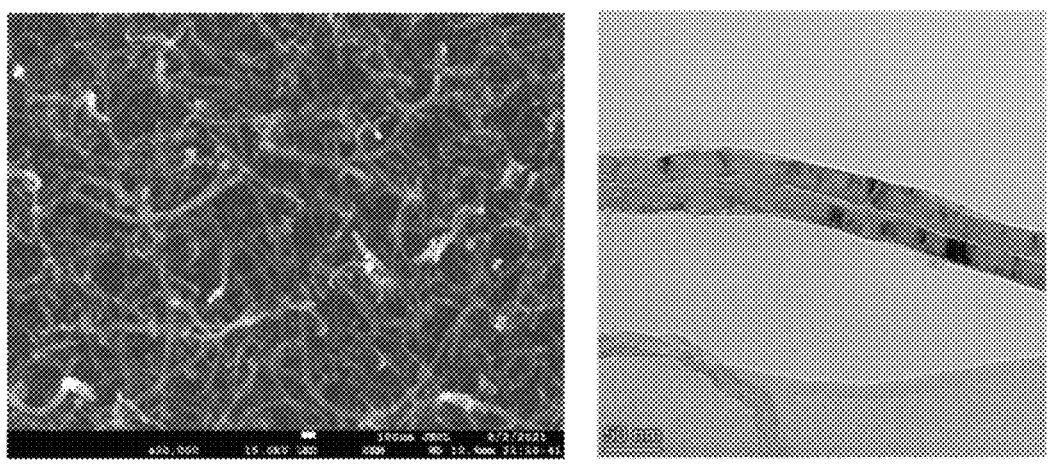
FIG. 1 shows SEM and TEM images of multiwalled carbon nanotubes prepared according to one embodiment of the present invention.

To further explaining the objective, technical schemes, and advantages of the present invention, detailed description of some embodiments will be made with reference to the accompanying drawings.

The carbon-nanotube-based field-emission sensor of the present invention adopts a dual-electrode structure, and is mainly composed of a carbon-nanotube-based cathode and an electrically conductive anode that is made of, for example, stainless steel or electrically conductive glass. The carbon nanotube-based sensor is packaged into a vacuum system to be detected so that its anode and cathode are connected to different electrodes, respectively. The distance between the anode and the cathode is determined by the thickness of a ceramic insulator arranged therebetween. In the vacuum environment, the voltage applied to the anode is higher than that applied to the cathode, so as to form a potential difference U between the two electrodes. When the electric field intensity at the surface of the cathode reaches a field-emission threshold of the carbon nanotubes, electrons are emitted from the surfaces of the carbon nanotubes to form a field-emission current I, from which a field-emission current-voltage characteristic curve (I-V) can be determined. If the vacuum chamber is permeated by He, resulting effects such as gas absorption can lead to increase of low-current field emission of the cathode sensor. The average of variations of the field-emission current in a time period t is indicative of how much He enters the vacuum environment in the chamber, thereby indicating the leak rate of the vacuum system.

On the basis of the technical principle of the present invention, a pressure detection method is also proposed by the inventors. The method comprises the following steps: i) performing a Joule-heat degassing process on the carbon-nanotube-based cathode for a time period to with a large field-emission current having a density $J_0$ so that Joule heat makes carbon nanotubes of the cathode release gas that was absorbed on their surfaces previously thus enters the carbon nanotubes into an intrinsic emission state; ii) upon completion of the degassing process, setting the field-emission current to an initial, small emission current of 1 µA rapidly, using software to record an average of values of the field-emission current in a time period t, testing the carbon-nanotube-based cathode for a field-emission sensing effect thereof with different pressures of helium gas so as to form a sensing characteristic curve of the carbon-nanotube-based field-emission sensor, performing fitting on the sensing characteristic curve so as to obtain an index curve, and converting different pressures of the helium gas into corresponding vacuum leak rates; and iii) packaging the carbon-nanotube-based cathode into a vacuum chamber in a system to be detected, performing testing when a helium stream reaches balance, obtaining an average of current variations in the time period t from the testing, comparing the average with the index curve so as to determine a vacuum leak rate of the system to be detected.

The inventors implement the disclosed technology to successively indicate the leak rate of a dynamic vacuum system. The following description will be directed to how a carbon-nanotube-based cathode growing directly in a thermal CVD tube furnace is used to indicate vacuum leak.

Figure 2:
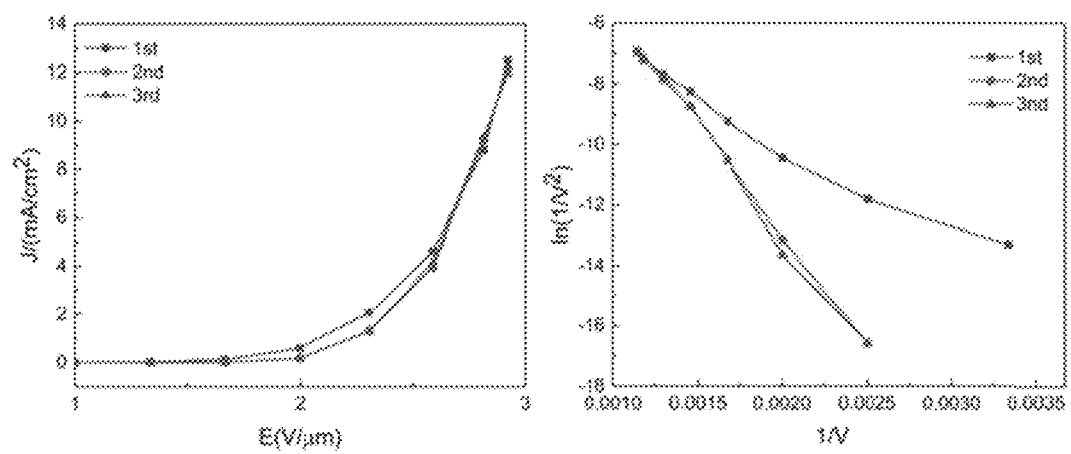
FIG. 2 graphically shows results of field-emission performance testing of the carbon-nanotube-based cathode according to one embodiment of the present invention.

In an example of the present invention, to prepare carbon nanotubes by means of CVD, a Hastelloy alloy (Ni:Mo:Cr:Fe:W:Co:Mn=57.5:15.5:15.5:6:3.5:1.5:0.5) was used as the substrate, argon was used as the protective gas, and acetylene was used as the carbon-source gas required by growth of carbon nanotubes. Preparation of the carbon-nanotube-based cathode was performed at 750° C. The looks of the resulting carbon nanotubes under SEM and TEM are provided in FIG. 1. As shown, the carbon nanotubes were not smooth and contain some carbon impurities. However, this type of carbon nanotubes can be distributed evenly on the substrate, and this is desired to stable field emission. The tests for field emission were performed in an area of 2 mm×3 mm, with the carbon-nanotube-based cathode and the anode separated by 300 µm. FIG. 2 shows the field emission performance of the carbon-nanotube-based cathode in the tests. As can be seen, the carbon-nanotube-based cathode had a low turn-on field (1.7V/µm) and a low threshold field (2.85V/µm), indicating that the selected carbon nanotube samples had good field emission. Excellent field emission performance is contributive to stability in subsequent He sensing performance tests. The sample with the most stable field emission performance was then picked for He sensing tests.

Figure 3:
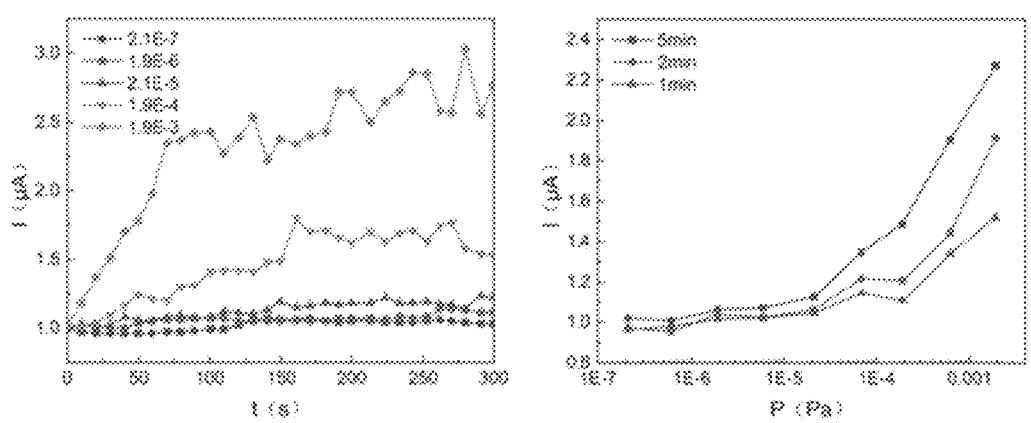
FIG. 3(a) displays real-time records of sensing performance of the carbon-nanotube-based cathode under five different magnitudes of the He atmosphere and (b) shows curves of sensing performance of carbon nanotubes in the He atmosphere.
Figure 4:
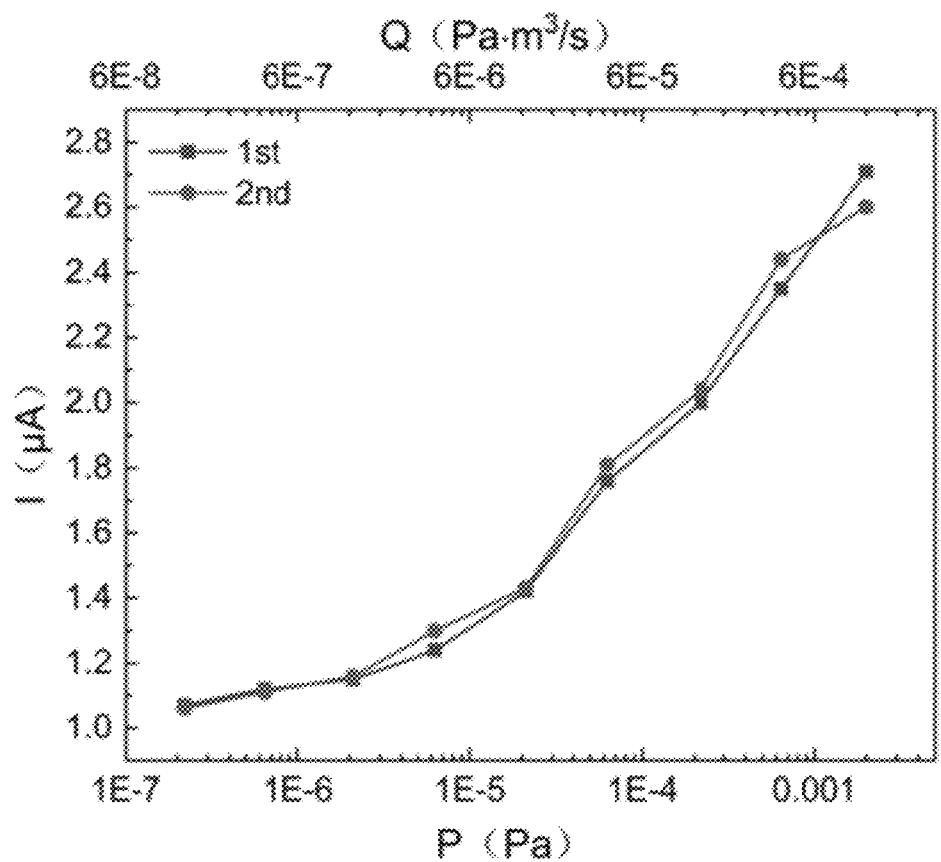
FIG. 4 shows curves of sensing repeatability of the carbon nanotube-based sensor.
Figure 5:
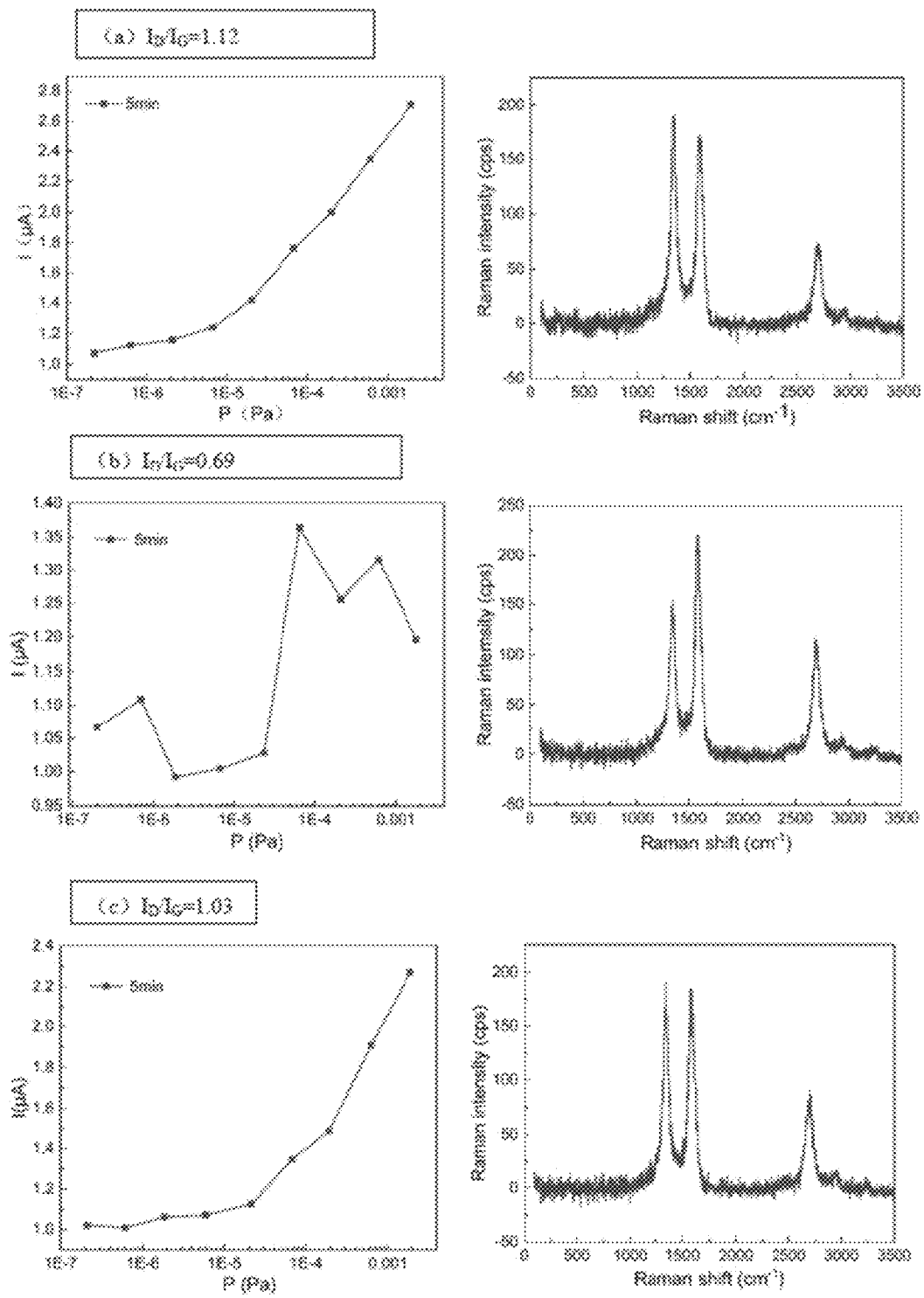
FIG. 5 provides comparisons between sensing performance curves and Raman spectra of the different carbon nanotube-based sensor samples, where (a) is for the sample of $I_D/I_G=1.12$, (b) is for the sample of $I_D/I_G=0.69$, and (c) is for the sample of $I_D/I_G=1.03$.

FIG. 3 shows the He sensing results obtained under different pressure levels. Variations of the current in five minutes were recorded and averages were obtained for periods of 1 min, 2 min, and 5 min. As shown, with relatively short time, the average of current variations in five minutes exhibits good sensing performance, so the average of current variations in five minutes was selected to represent the sensing performance of the carbon nanotubes.

As found in our experiments, helium sensing performance of a carbon nanotube is directly related to its crystallography. Specifically, a material having its Raman amorphous peak (the D peak) higher than its graphite peak (the G peak) performed better in He sensing. The relationships of He sensing performance with the D peak, the G peak, and the ratio of the two are shown in Table 1. As can be seen, a high amorphous D peak means that there were more defects. A theoretical study suggests that absorption of He atoms at defective sites can increase local charge accumulation, which is favorable to electron field emission, thereby providing pressure sensing effects.

TABLE 1

Impacts of samples with different Raman performances on He sensing

| CNT Type | Sample | D Peak Frequency (cm$^{-1}$) | D Peak Intensity (cps) | G Peak Frequency (cm$^{-1}$) | G Peak Intensity (cps) | $I_D/I_G$ Ratio | He Sensing |
|---|---|---|---|---|---|---|---|
| Low $I_D/I_G$ Ratio Sample | 1 | 1360 | 132 | 1590 | 207 | 0.64 | Weak |
| | 2 | 1349 | 137 | 1587 | 178 | 0.77 | Weak |
| | 3 | 1353 | 146 | 1591 | 204 | 0.72 | Weak |
| | 4 | 1357 | 148 | 1590 | 205 | 0.72 | Weak |
| | 5 | 1348 | 139 | 1589 | 210 | 0.66 | Weak |
| | 6 | 1358 | 94.5 | 1584 | 169 | 0.56 | Weak |

TABLE 1-continued

Impacts of samples with different Raman performances on He sensing

| CNT Type | Sample | D Peak Frequency (cm$^{-1}$) | D Peak Intensity (cps) | G Peak Frequency (cm$^{-1}$) | G Peak Intensity (cps) | $I_D/I_G$ Ratio | He Sensing |
|---|---|---|---|---|---|---|---|
| High $I_D/I_G$ Ratio Sample | 1 | 1359 | 197 | 1595 | 169 | 1.17 | Strong |
| | 2 | 1352 | 193 | 1588 | 168 | 1.15 | Strong |
| | 3 | 1357 | 158 | 1591 | 132 | 1.20 | Strong |
| | 4 | 1353 | 522 | 1587 | 370 | 1.41 | Strong |
| | 5 | 1354 | 191 | 1588 | 185 | 1.03 | Strong |
| | 6 | 1362 | 227 | 1590 | 169 | 1.34 | Strong |

The device is advantages for its high sensitivity, microminiaturized design, low costs, simple structure, and easy operation.

TABLE 2

Repeatability test errors of the carbon-nanotube-based cathode under a given vacuum leak rate

| P/Pa | Average Current 1st | Average Current 2nd | Percentage Error |
|---|---|---|---|
| 2.2E−7 | E07 | 1.06 | 0.93% |
| 6.4E−7 | E12 | 1.11 | 0.89% |
| 2.1E−6 | E15 | 1.16 | 0.87% |
| 6.3E−6 | E24 | 1.30 | 4.84% |
| 2.1E−5 | 1.42 | 1.43 | 0.70% |
| 6.3E−5 | 1.76 | 1.81 | 2.84% |
| 2.2E−4 | 2.00 | 2.04 | 2.00% |
| 6.4E−4 | 2.35 | 2.44 | 3.83% |
| 0.002 | 2.71 | 2.60 | 4.05% |

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A vacuum-helium-leak-detection method based on a carbon-nanotube-based field-emission sensor, which includes a carbon-nanotube-based cathode having a Raman amorphous peak $I_D$/graphite peak $I_G$ ratio greater than 1.0 and an electrically conductive anode, the method including steps of:

(1) performing a Joule-heat degassing process on the carbon-nanotube-based cathode for a time period to with a large field-emission current having a density $J_0$ so that Joule heat makes carbon nanotubes of the cathode release gas that was absorbed on their surfaces previously thus enters the carbon nanotubes into an intrinsic emission state;

(2) upon completion of the degassing process, setting the field-emission current to an initial, small emission current thereof rapidly, recording an average of values of the field-emission current in a time period t, testing the carbon-nanotube-based cathode for field-emission sensing effect with helium gas at different pressure levels so as to form a sensing characteristic curve of the carbon-nanotube-based field-emission sensor, performing fitting on the sensing characteristic curve so as to obtain an index curve, and converting the different pressure levels of the helium gas into corresponding vacuum leak rates; and (3) packaging the carbon-nanotube-based cathode into a vacuum chamber in a system to be detected, performing testing when a helium stream reaches balance, obtaining an average of current variations in the time period t from the testing, comparing the average of the current variations with the index curve obtained in Step (2) so as to determine a vacuum leak rate of the system to be detected.

2. The vacuum-helium-leak-detection method of claim 1, wherein the carbon-nanotube-based cathode is prepared using a CVD method, which involves: preparing a film used to form the carbon-nanotube-based cathode at a high temperature by using a Hastelloy alloy as a substrate, using argon as a protective gas, and using acetylene as a carbon-source gas required by growth of the carbon nanotubes.

* * * * *